United States Patent [19]

Mikame et al.

[11] Patent Number: 5,738,056
[45] Date of Patent: Apr. 14, 1998

[54] VARIABLE VALVE TIMING MECHANISM FOR INTERNAL COMBUSTION ENGINE

[75] Inventors: Kazuhisa Mikame, Nagoya; Tatsuo Iida, Toyota, both of Japan

[73] Assignee: Toyota Jidosha Kabushiki Kaisha, Aichi-ken, Japan

[21] Appl. No.: 832,264

[22] Filed: Apr. 3, 1997

[30] Foreign Application Priority Data

Apr. 4, 1996 [JP] Japan .................................. 8-82619

[51] Int. Cl.$^6$ .................................. F01L 1/344
[52] U.S. Cl. .................. 123/90.17; 123/90.31; 74/568 R; 464/2
[58] Field of Search ................ 123/90.15, 90.17, 123/90.31; 74/567, 568 R; 454/1, 2, 160

[56] References Cited

U.S. PATENT DOCUMENTS

| | | | |
|---|---|---|---|
| 4,858,572 | 8/1989 | Shirai et al. | 123/90.12 |
| 5,107,804 | 4/1992 | Becker et al. | 123/90.17 |
| 5,450,825 | 9/1995 | Geyer et al. | 123/90.17 |
| 5,520,145 | 5/1996 | Nagai et al. | 123/90.17 |

FOREIGN PATENT DOCUMENTS 196 23 818 A  12/1996  Germany .
192504A  4/1989  Japan .
5106412A  4/1993  Japan .

*Primary Examiner*—Weilun Lo
*Attorney, Agent, or Firm*—Kenyon & Kenyon

[57] ABSTRACT

A variable valve timing mechanism of an internal combustion engine varies the valve timing by varying the rotation phase of the camshaft with respect to a reference rotation phase of the drive shaft of the engine. The mechanism has a first rotation member and a second rotation member. The first rotation member rotates in fixed synchronism with the drive shaft and has at least one recess therein. The second rotation member is located within the first rotation member and rotates integrally with the camshaft. The second rotation member has a vane within the recess. The vane is movable between two walls of the recess and divides the recess into first and second pressure chambers. Hydraulic fluid pressure causes relative rotation of the second rotation member with respect to the first rotation member by applying pressure to the first and second pressure chambers to move the vane. The mechanism further has a lock device. The lock device restricts the relative rotation of the second rotation member with respect to the first rotation member such that the vane is kept between the two recess walls when the engine is cranking. The lock device is released after the engine reaches a predetermined running condition.

18 Claims, 6 Drawing Sheets

Fig. 5
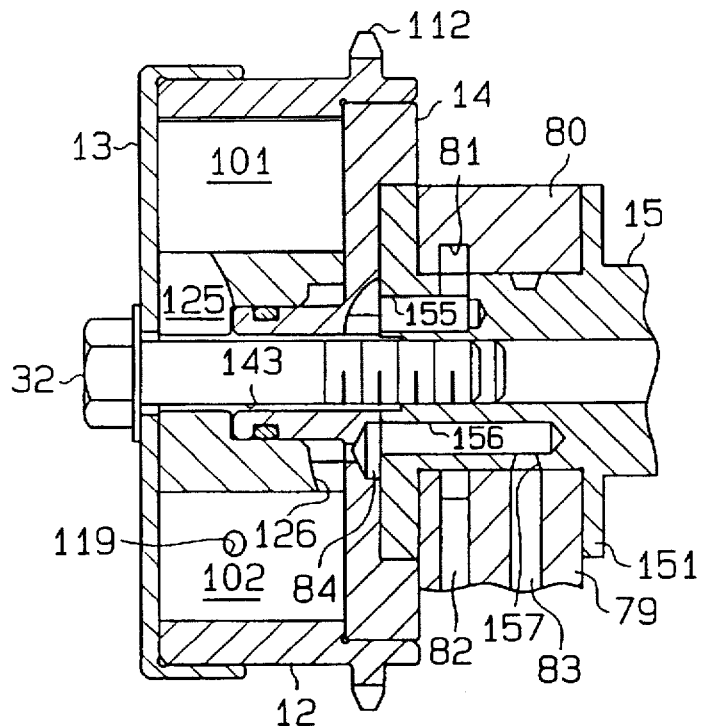
Fig. 6
Fig. 7 (Prior Art)
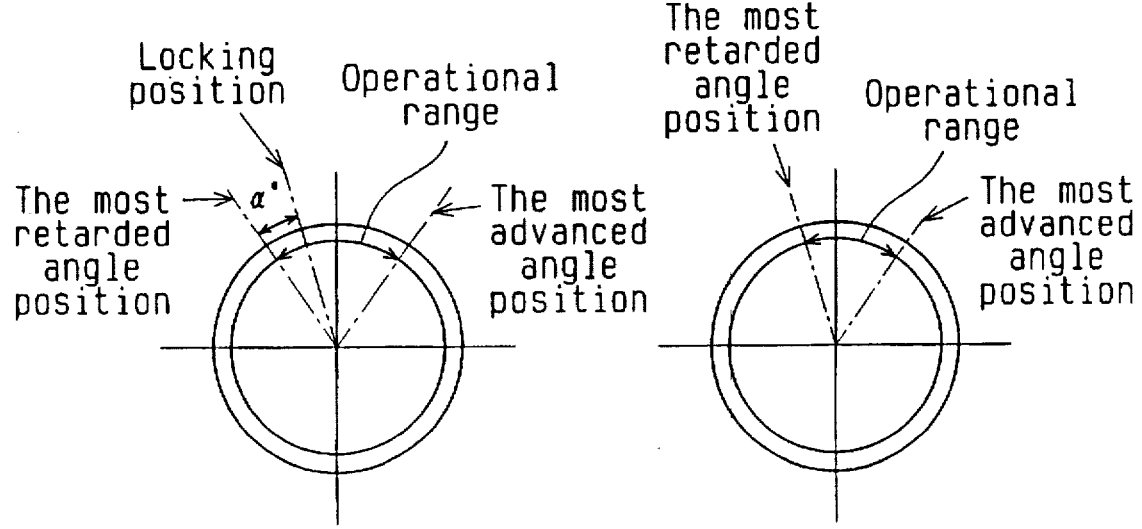

VARIABLE VALVE TIMING MECHANISM FOR INTERNAL COMBUSTION ENGINE

BACKGROUND OF THE INVENTION

1. Field of the Invention

The present invention relates to a variable valve timing control mechanism that controls at least one of the intake valve timing and the exhaust valve timing of an engine in accordance with the running condition of the engine.

2. Description of the Related Art

Variable valve timing mechanisms that control the valve timing of an engine valve in accordance with the running condition of the engine are in use. One type of such variable valve timing mechanism continuously varies the rotation phase (displacement angle) of a camshaft with respect to a crankshaft.

Japanese Unexamined Patent Publication No. 1-92504 discloses a variable valve timing mechanism of a continuously variable phase type that allows relative rotation between a timing pulley and an inner rotor for varying the valve timing. One example of this type will now be described with reference to FIG. 8.

A variable valve timing mechanism 90 includes a timing pulley 91 and an inner rotor 92. The timing pulley 91 has a plurality of projections 911 that project from the inner surface of the pulley 91 toward the center of the pulley 91. Oil chambers 912 are defined by each pair of adjacent projections 911. A plurality of vanes 921 project from the inner rotor 92. Each vane 921 is accommodated in one of the chambers 912. The vanes 921 and the walls of the chambers 912 define pressure chambers 93, one of which is on each side of each vane 921. The timing pulley 91 is connected to a crankshaft by a timing belt. The inner rotor 92 is secured to a camshaft 94. A plurality of passages 96 are defined in the camshaft 94, and a plurality of passages 97 are defined in the inner rotor 92.

Oil is supplied to the pressure chambers 93 via the passages 96 in the camshaft 94 and the passages 97 in the inner rotor 92. The inner rotor 92 and the camshaft 94 are integrally rotated with respect to the timing pulley 91 by the fluid pressure in the pressure chambers 93 acting on the vanes 921.

A pair of holes 913 are formed radially in a pair of opposing projections 911, respectively. A lock pin 95 and a spring 951 are accommodated in each hole 913. Each lock pin 95 is urged toward the center of the timing pulley 91 by the associated spring 951. Engaging holes 922 are defined in a pair of the passages 97 in the inner rotor 92. Each hole 922 corresponds to one of the lock pins 95. Each lock pin 95 is engageable with its corresponding hole 922. Specifically, one of the pins 95 is engaged with its corresponding hole 922 when the vanes 921 are at one of the maximum displacement positions at which the vanes 921 contact one of the walls of the chambers 912. When the force of the oil pressure in the passages 97 is greater than the force of the springs 951, the lock pin 95 that is engaged with one of the holes 922 is retracted and disengaged.

When the engine is started, the oil in the passages 96, 97 is not pressurized. Therefore, one of the lock pins 95 is engaged with the associated engaging hole 922 by the force of the associated spring 951. This allows the vanes 921 to remain at one of the maximum displacement positions, which restricts the relative rotation between the timing pulley 91 and the inner rotor 92.

When the oil pressure in the passages 96, 97 is increased to a sufficient level by operation of the engine, the oil pressure acting on the lock pins 95 increases, accordingly. As a result, the pin 95 that is engaged with the associated hole 922 is pushed by the oil pressure against the force of the associated spring 951 and is therefore disengaged from the hole 922. If the pressures in the pressure chambers 93 on opposite sides of each vane 921 are different, the vanes 93 move toward the pressure chamber 93 that has the lower pressure. Accordingly, the timing pulley 91 is rotated with respect to the inner rotor 92.

In the variable valve timing mechanism 90, the timing pulley 91 synchronously rotates with the crankshaft. Therefore, relative rotation between the timing pulley 91 and the inner rotor 92 changes the rotation phase of the camshaft 94 with respect to the referential rotation phase of the engine, or the rotation phase of the crankshaft. Accordingly, the valve timing is advanced or retarded with respect to the crank angle.

Some of the variable valve timing mechanisms of the above type vary the intake valve timing. If the intake valve closing timing is retarded by retarding the camshaft's rotation phase when starting the engine, the air-fuel mixture in the combustion chambers is returned into the intake pipe.

When the engine is being cranked, the engine speed is extremely low. At this time, return of air-fuel mixture into the intake pipe lowers the effective compression ratio, thereby hindering engine starting. When the temperature of the air-fuel mixture is low, its volume is small. In this state, cranking the engine does not compress the mixture to a sufficient level. This further hinders starting of the engine.

Retarding the valve timing from the valve timing that is suitable for starting the engine retards the times at which the intake valves are closed. This permits the intake air inertia effect to increase the amount of intake air when the engine speed is high, and thus improves the power characteristics of the engine. Returning air-fuel mixture by retarding the intake valve closing times also decreases pumping loss. The fuel consumption characteristics of the engine are thus improved.

However, in the prior art variable valve timing mechanism 90 of FIG. 8, the valve timing is at its most retarded position when the engine is started for obtaining a desirable starting performance of the engine. Therefore, the valve timing cannot be further retarded when the engine is running.

Further, when the engine is started, an excessively advanced valve timing of the intake valves prolongs valve overlap. This increases the amount of exhaust gas recirculation (EGR) in the combustion chambers, thereby degrading the starting performance of the engine.

Some variable valve timing mechanisms control the valve timing of the exhaust valves. When an engine having this mechanism is started, an excessively retarded valve timing of the exhaust valves prolongs valve overlap. This increases the amount of EGR in the combustion chambers, thereby degrading the starting performance of the engine.

When the engine is started, an excessively advanced valve timing of the exhaust valves advances the times at which the exhaust valves are opened, thereby elongating the opening period of the exhaust valves in combustion strokes. This prevents the combustion pressure generated in combustion strokes from being used most effectively. Accordingly, the starting performance of the engine is degraded.

SUMMARY OF THE INVENTION

The present invention is accomplished in view of the circumstances described above, and it is an objective of the present invention to provide a variable valve timing mechanism for an internal combustion engine that improves the starting performance of the engine and expands the variation range of the valve timing while the engine is operated, thereby improving the power characteristics of the engine. The present invention can be implemented in numerous ways, including as an apparatus and a method.

As a variable valve timing mechanism for an internal combustion engine, the present invention includes the engine having at least one valve, which is driven by a driven shaft, and a drive shaft. The variable valve timing mechanism serves to vary the timing of the engine valve by varying the rotational phase of the driven shaft with respect to the drive shaft. The variable valve mechanism includes a first rotary member for rotating in fixed synchronism with the drive shaft, a second rotary member for rotating in fixed synchronism with the driven shaft, and a hydraulic actuating mechanism. The hydraulic mechanism varies the position of the first rotary member with respect to the second rotary member, which changes the phase of the driven shaft with respect to the drive shaft. The hydraulic actuating mechanism includes a movable actuator that is movable in two opposite directions between a valve advance limit position and a valve retard limit position. At the valve advance limit position, the actuator is stopped at a position where the valve timing is advanced to a maximum degree. At the valve retard limit position, the actuator is stopped at a position where the valve timing is retarded to a maximum degree. The movement of the actuator causes the first rotary member to rotate with respect to the second rotary member thus changing the rotary phase of the drive shaft with respect to the driven shaft. The hydraulic actuating mechanism further includes a first hydraulic chamber located on one side of the actuator, a second hydraulic chamber located on the opposite side of the actuator, means for selectively applying hydraulic fluid pressure to the first and second pressure chambers to cause the actuator to move in a selected direction and a lock member for locking the first rotary member. The lock member locks the first rotary member to the second rotary member at a predetermined position for fixing the phase of the driven shaft with respect to the drive shaft, and has a locked position and an unlocked position. At the locked position, the first rotary member is fixed with respect to the second rotary member and the actuator is fixed with respect to the hydraulic pressure chambers. At the unlocked position, the actuator may move with respect to the hydraulic pressure chambers to permit relative movement between the first and second rotary members. The lock member is biased such that the lock member is moved toward the locked position when the engine is not running.

As a method of locking a variable valve timing mechanism for an internal combustion engine, the present invention performs the operation of locking the first rotary member to the second rotary member with a lock member at a predetermined position for fixing the phase of the driven shaft with respect to the drive shaft when the engine is being cranked. The lock member has a locked position and an unlocked position. At the locked position, the first rotary member is fixed with respect to the second rotary member. At the unlocked position, relative movement between the first and second rotary members is permitted. The method also performs the operation of moving the lock member toward its locked position when the engine stops running, and moving the lock member away from its locked position when the engine has reached a predetermined running condition after being started.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiment together with the accompanying drawings in which:

FIG. 5 is a cross-sectional view taken along line 5—5 of FIG. 3;

FIG. 6 is a diagram explaining the operational range of a variable valve timing mechanism for an internal combustion engine;

FIG. 7 is a diagram explaining the operational range of a prior art variable valve timing mechanism.

DETAILED DESCRIPTION OF THE PREFERRED EMBODIMENT

A variable valve timing mechanism (VVT) according to a preferred embodiment of the present invention will now be described with reference to the drawings.

Figure 1:
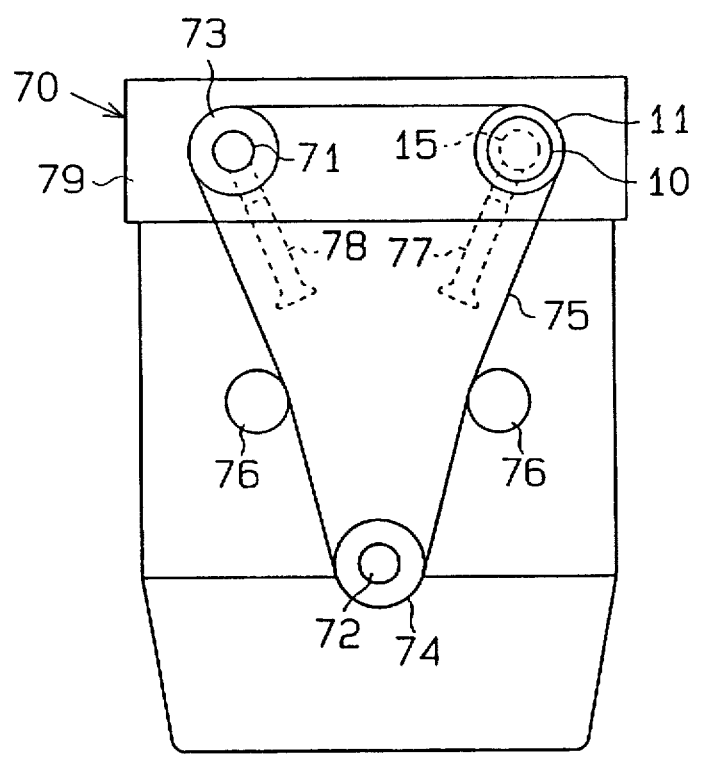
FIG. 1 is a schematic front view illustrating an internal combustion engine according to the present invention.

An engine 70 illustrated in FIG. 1 includes an intake camshaft 15, an exhaust camshaft 71 and a crankshaft 72. Sprockets 11, 73 and 74 are secured to the ends of the shafts 15, 71 and 72, respectively. The sprockets 11, 73, 74 are connected by a timing chain 75. A pair of chain tensioners 76 apply tension to the chain 75. A variable valve timing mechanism (VVT) is provided on the intake camshaft 15. Rotation of the crankshaft 72 is transmitted to the camshafts 15, 71 by the chain 75 and the sprockets 11, 73, 74. Accordingly, the camshafts 15, 71 synchronously rotate with the crankshaft 72, thereby actuating intake valves 77 and exhaust valves 78 at a predetermined valve timing.

As shown in FIGS. 2 to 5, the VVT 10 includes the sprocket 11, a rotor 12, a front cover 13, a rear plate 14, and the intake camshaft 15.

Figure 4:
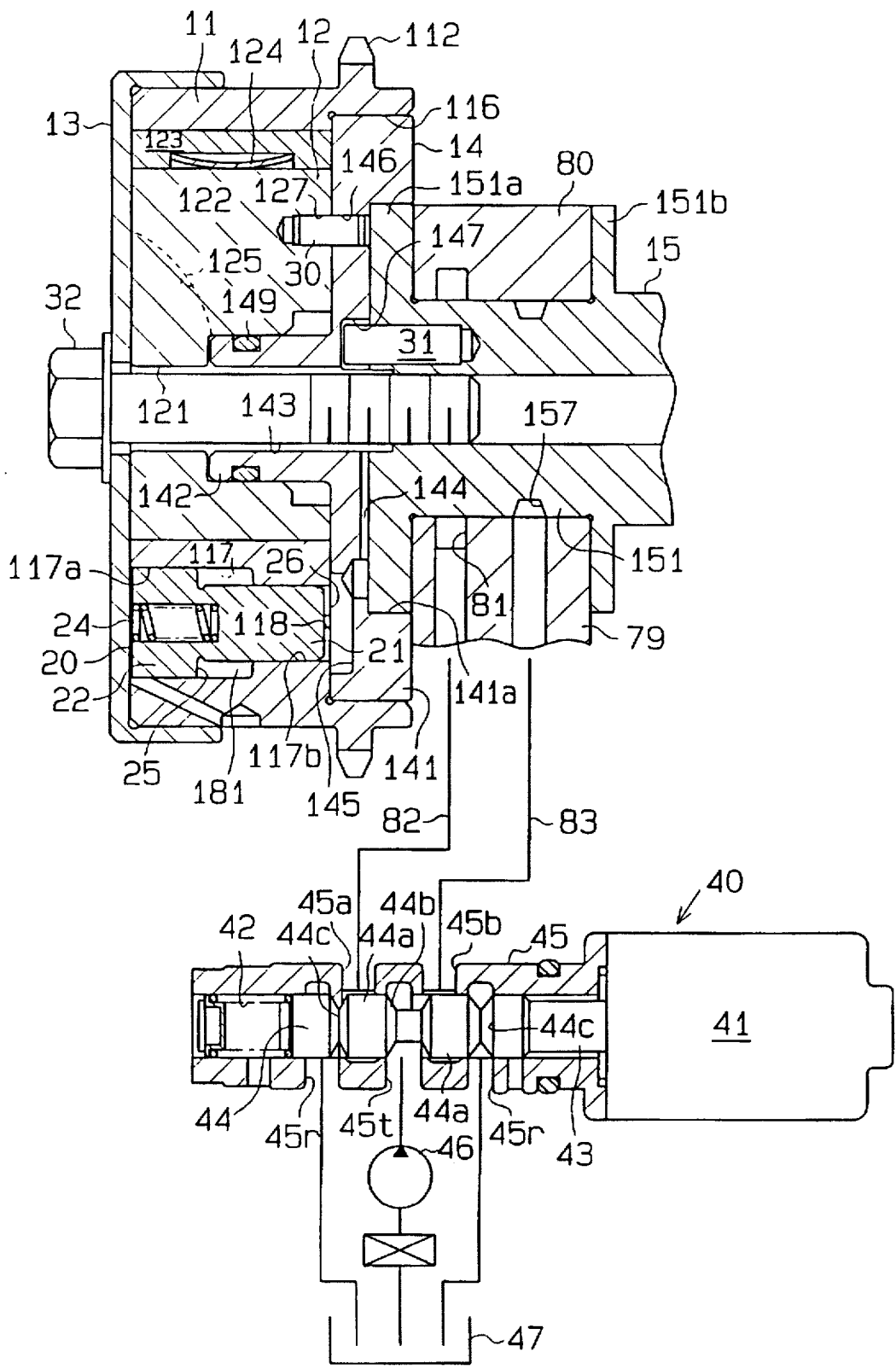
FIG. 4 is a cross-sectional view taken along line 4—4 of FIG. 3.
Figure 8:
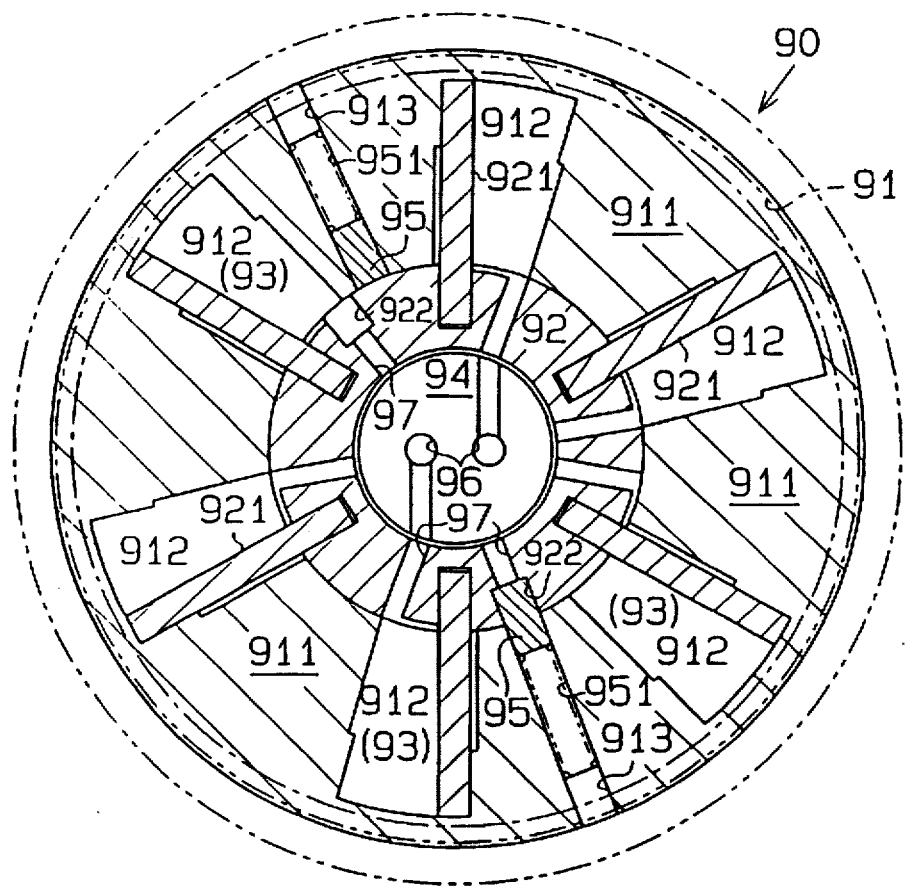
FIG. 8 is a front cross-sectional view illustrating a prior art variable valve timing mechanism.

The intake camshaft 15 has a plurality of journals 151 (only one is shown). As shown in FIG. 4, a journal 151 located at an end of the camshaft 15 has a pair of flanges 151a and 151b. The camshaft 15 is rotatably supported on a cylinder head 79 by cooperation of the flanges 151a, 151b and a bearing cap 80.

The rear plate 14 includes a disk portion 141 and a boss 142. A circular recess 141a is formed in the rear side of the boss 142. The rear plate 14 is fitted to the flange 151a at the recess 141a. The flange 151a is provided with an engaging pin 31 projecting forward, and the disk portion 141 of the rear plate 14 is provided with a pin hole 147. The pin 31 is engaged with the hole 147. This permits integral rotation of the rear plate 14 with the camshaft 15.

The rotor 12 is provided with an axial bore 121. A step is defined in the bore 121. The rotor 12 also has four radially projecting vanes 122. Each vane 122 is equally spaced apart from the adjacent vanes 122. The rotor 12 is coaxially fitted to the boss 142 of the rear plate 14 as shown in FIG. 4. A plurality of holes 146 are formed in the disk portion 141 of the rear plate 14. A plurality of engaging pins 30 (only one is shown) are fixed in the holes 146 and project forward. Each vane 122 has a hole 127. The pins 30 are engaged with the holes 127. This permits integral rotation of the rotor 12 with the rear plate 14 and the camshaft 15. A seal 149 is located between the boss 142 and the rotor 12 for sealing between the boss 142 and the rotor 12.

The sprocket 11 has a substantially cylindrical shape and is located about the rear plate 14. The sprocket 11 has a circular recess 116, the diameter of which is substantially the same as that of the disk portion 141 of the rear plate 14. The sprocket 11 is engaged with the disk portion 141 of the rear plate 14 at the recess 116. Thus, the sprocket 11 is rotatably supported on the rear plate 14.

The front end of the sprocket 11 and the rotor 12 are covered by a front cover 13. The cover 13 is fixed to the camshaft 15 by a bolt 32. This permits a relative rotation of the sprocket 11 with respect to the front cover 13. In other words, the front cover 13 rotates integrally with the rotor 12, rear plate 14 and the camshaft 15.

A plurality of teeth 112 are formed on the circumference of the sprocket 12. As shown in FIG. 4, the teeth 112 are radially aligned with the recess 116. The chain 75 is meshed with the teeth 112. As show in FIG. 3, the sprocket 12 is provided with four projections 115 that project from the inner circumference of the sprocket 12 toward the axis. The projections 115 are equally spaced apart. Each pair of adjacent projections 115 define a vane chamber 114 for accommodating one of the vanes 122 of the rotor 12. The projections 115 also define a cylindrical space at the center part of the sprocket 12 for accommodating the cylindrical portion of the rotor 12. When the rotor 12 is accommodated in the sprocket 12, each vane 122 and the associated vane chamber 114 define an advanced angle chamber 101 and a retarded angle chamber 102.

A seal 123 is fitted in the end of each vane 122 and pressed against the inner wall of the associated vane chamber 114 by a leaf spring 124. Each seal 123 seals the corresponding advanced angle chamber 101 and the retarded angle chamber 102 from each other. When the chambers 101 and 102 are filled with oil, the pressure of the oil couples the rotor 12 to the sprocket 11. Thus, rotation of the sprocket 11 is transmitted to the rotor 12 by the oil. Accordingly, the camshaft 15 rotates with the rotor 12.

If the pressure in the retarded angle chambers 102 is greater than the pressure in the advanced angle chambers 101, the vane 122 rotates counterclockwise (as viewed in FIG. 3) with respect to the sprocket 11. When each vane 122 contacts the wall of the advanced angle chamber 101, the camshaft 15 is located at the most retarded angle position with respect to the crankshaft 72. Contrarily, if the pressure in the advanced angle chambers 101 is greater than the pressure in the retarded angle chambers 102, the vane 122 rotates clockwise (as viewed in FIG. 3) with respect to sprocket 11. When each vane 122 contacts with the wall of the retarded angle chamber 102, the camshaft 15 is located at the most advanced angle position with respect to the crankshaft 72.

Figure 2:
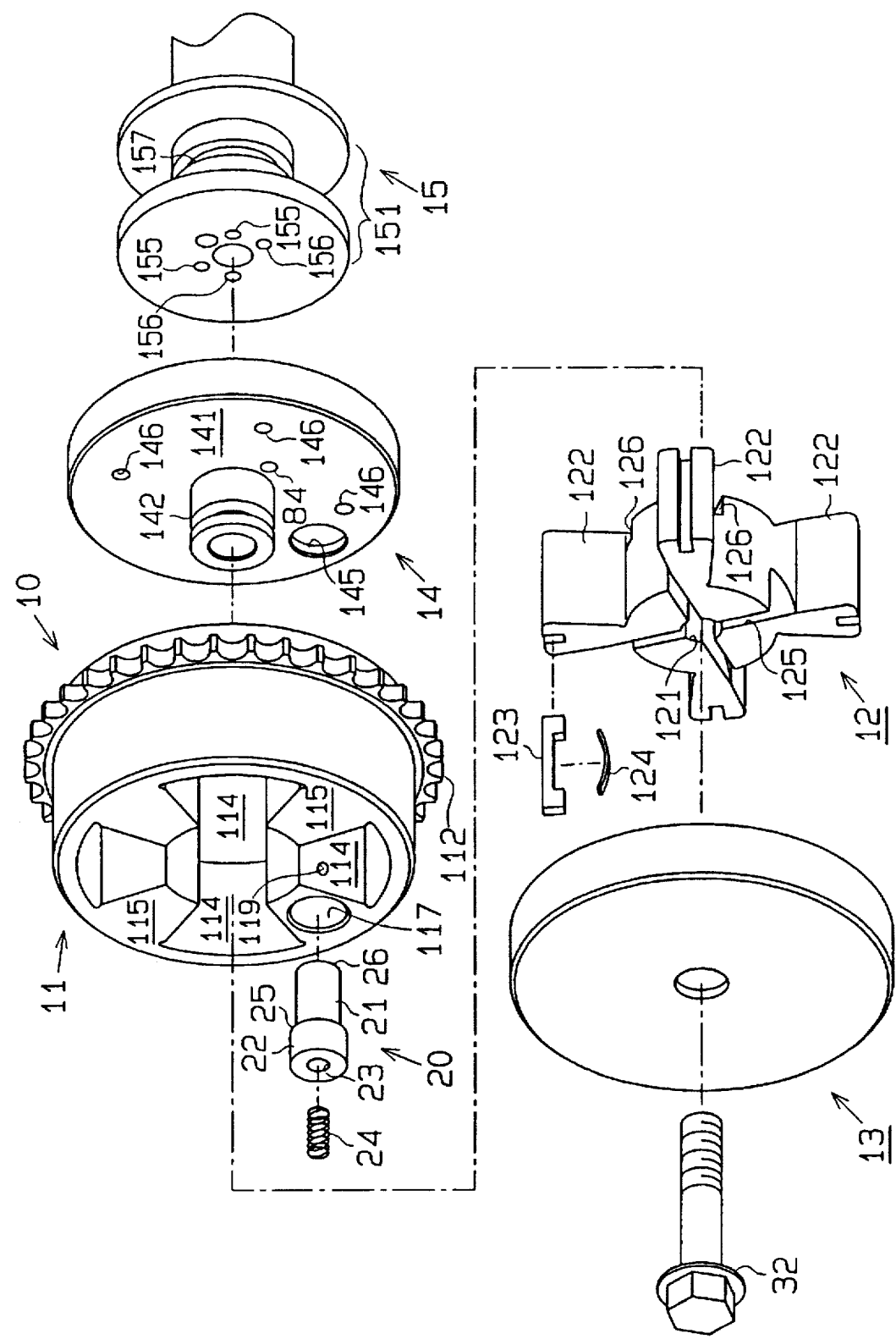
FIG. 2 is an exploded perspective view illustrating a variable valve timing mechanism for an internal combustion engine.
Figure 3:
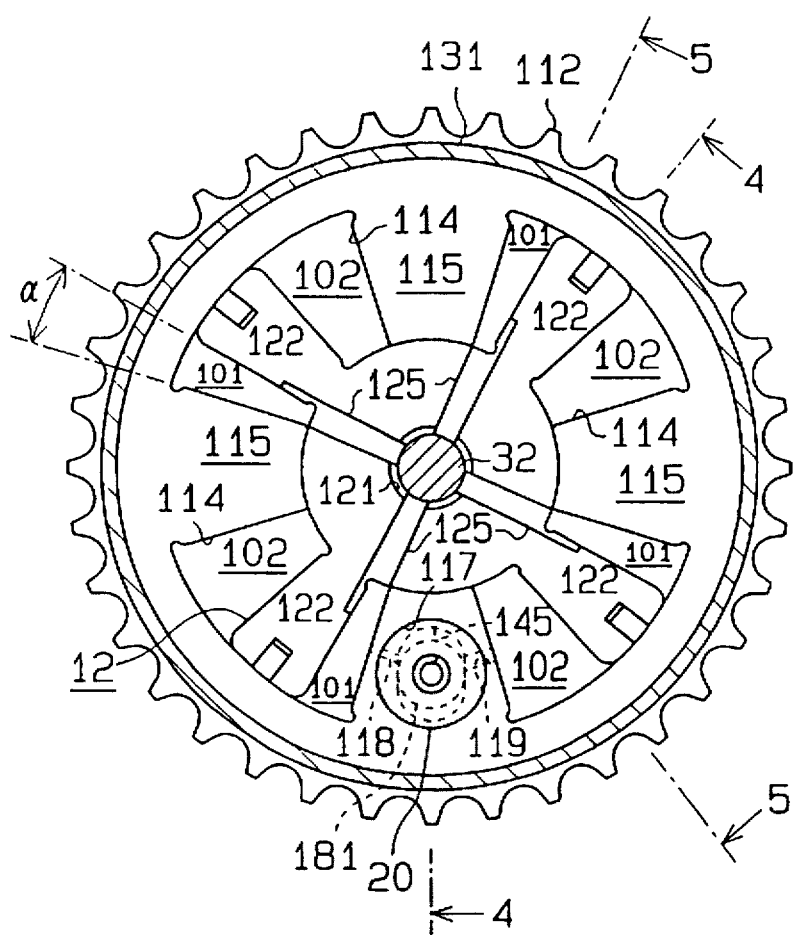
FIG. 3 is a front view illustrating a variable valve timing mechanism for an internal combustion engine with the cover removed.

As shown in FIGS. 2 to 4, an accommodating bore 117 is formed in one of the projections 115 of the sprocket 11. The bore 117 extends parallel to the axis of the camshaft 15 and has a step defined therein. A locking recess 145 is formed in the rear plate 14. The recess 145 faces the bore 117 and has an oblong shape. That is, the length of the recess 145 in the radial direction of the plate 14 is longer than its width, as seen in FIG. 3.

The bore 117 has a large diameter portion 117a and a small diameter portion 117b. A lock pin 20 is slidably accommodated in the bore 117. The lock pin 20 has a small diameter portion 21 at the rear end and a large diameter portion 22 at the front end as seen in FIG. 4. The large diameter portion 22 of the pin 20 is shorter than the large diameter portion 117a of the bore 117, and the small diameter portion 21 of the pin 20 is longer than the small diameter portion 117b of the bore 117. Therefore, an annular compression chamber 181 is defined between the large diameter portion 22 of the pin 20 and the small diameter portion 117b of the bore 117.

The pressure of oil in the compression chamber 181 acts on a step defined on the lock pin 20, or a first pressure receiving surface 25. The rear end face of the small diameter portion 21 of the lock pin 20 serves as a second pressure receiving surface 26. A spring 24 extends in a hole formed in the large diameter portion 22 of the lock pin 20 and contacts the front cover 13. The spring 24 urges the lock pin 20 in a direction causing engagement of the pin 20 with the lock recess 145. When the sum of the forces of pressure acting on the first pressure receiving surface 25 and on the second pressure receiving surface 26 is smaller than the force of the spring 24, the spring 24 causes the lock pin 20 to abut against the front face of the disk portion 141, or to be engaged with the lock recess 145 of the rear plate 14.

When the lock pin 20 abuts against the disk portion 141, if the sprocket 11 rotates with respect to the rear plate 14 such that the lock pin 20 is aligned with the lock recess 145, the lock pin 20 enters the lock recess 145. This mechanically couples the sprocket 11 with the rear plate 14.

When the lock pin 20 is engaged with the lock recess 145, the rotor 12 is located at the position shown in FIG. 3. At this position, each vane 122 is advanced from the most retarded angle position by α degrees.

When the force of pressure acting on the first pressure receiving surface 25 or pressure acting on the second pressure receiving surface 26 is greater than the force of the spring 24, the lock pin 20 is separated from the disk portion 141. This permits relative rotation between the sprocket 11 and the rear plate 14. In this state, the lock pin 20 is wholly accommodated in the bore 117 and is not abraded by the disk portion 141.

When assembling the valve timing mechanism, firstly, the rear plate 14 and the rotor 12 are attached to the flange 151a of the camshaft 15. Secondly, the sprocket 11 and the pin 20 are mounted on the rear plate 14. Finally, the front cover 13 is mounted on the sprocket 11 and the bolt 32 is inserted into the camshaft 15 through the rotor 12, the sprocket 11 and the rear plate 14.

Passages for supplying oil to the advanced angle chambers 101, the retarded angle chambers 102, and the first and second pressure receiving surfaces 25, 26 will now be described. As shown in FIG. 2, a cross-shaped advanced angle passage 125 is formed in the front face of the rotor 12. The advanced angle passage 125 communicates with each advanced angle chamber 101. An annular advanced angle groove 81 is formed in the inner wall of the bearing cap 80 and the cylinder head 79 about the journal 151 as shown FIGS. 4 and 5. The groove 81 is connected to a hydraulic pump 46 by a passage 82 and an oil control valve (OCV) 40.

A pair of L-shaped connection passages 155 are formed in the journal 151, and a space 143 is defined between the boss 142 and the bolt 32. The advanced angle groove 81 is connected to the advanced angle chambers 101 by the connection passages 155, the space 143 and the advanced angle passage 125. The hydraulic pump 46 supplies oil to the passage 82 via the OCV 40. The oil is then supplied to the advanced angle chambers 101 via the advanced angle groove 81, the connection passages 155, the space 143 and the advanced angle passage 125.

A cross-shaped retarded angle passage 126 is formed in the rear face of the rotor 12. The passage 126 has substantially the same shape as the advanced angle passage 125 and communicates with each retarded angle passage 102 (see FIGS. 2 and 5). An annular retarded angle passage 157 is formed in the circumference of the journal 151. The passage 157 is connected to the hydraulic pump 46 by a passage 83 and the OCV 40.

A pair of linear connection passages 156 are formed in the journal 151. The passages 156 extend in the axial direction of the camshaft 15. A pair of intermediate passages 84 are formed in the rear plate 14 (see FIG. 5). The passages 84 connect the connection passage 156 with the retarded angle passage 126. The hydraulic pump 46 supplies oil to the passage 83 via the OCV 40. The oil is then supplied to the retarded angle chambers 102 via the retarded angle passage 157, the connection passages 156, the intermediate passages 84 and the retarded angle passage 126.

As shown in FIG. 3, a retarded angle communicating passage 119 is formed in a side wall of the projection 115 that has the accommodating bore 117. The passage 119 connects the pressure chamber 181 defined in the accommodating bore 117 to the adjoining retarded angle chamber 102. The pressure in the retarded angle chamber 102 thus acts on the first pressure receiving surface 25 on the lock pin 20 via the communicating passage 119.

As shown in FIGS. 3 and 4, an advanced angle communicating passage 118 is formed in the rear face of the projection 115 that has the accommodating bore 117. The passage 118 connects the accommodating bore 117 to the adjoining advanced angle chamber 101. The pressure in the advanced angle chamber 101 thus acts on the second pressure receiving surface 26 on the lock pin 20 via the communicating passage 118.

As shown in FIG. 4, a radial passage 144 is formed in the rear end face of the rear plate 14. The space 143 is connected to the lock recess 145 by the radial passage 144 at an upstream part of the advanced angle passage 125. The pressure of oil supplied to the space 143 thus directly acts on the second pressure receiving surface 26 of the lock pin 20.

The OCV 40 is a control valve for controlling the course of oil that is supplied to the chambers 101 and 102. The OCV 40 includes a casing 45, a spool 44 and an electromagnetic actuator 41. The spool 44 is a cylindrical valve body and is reciprocally accommodated in the casing 45. The actuator 41 is secured to an end of the casing 45 and includes a plunger 43. The plunger 43 abuts against the spool 44. A coil spring 42 is accommodated in the casing 45 for urging the spool 44 toward the plunger 43.

The casing 45 of the OCV 40 further has a tank port 45t, an A port 45a, a B port 45b and a pair of reservoir ports 45r. The tank port 45t is connected to an oil pan 47 with the hydraulic pump 46 in between. The A port 45a is connected to the advanced angle groove 81 by the passage 82, and the B port 45b is connected to the retarded angle groove 157 by the passage 83. The reservoir ports 45r are connected to the oil pan 47.

The actuator 41 is subjected to duty control and moves the spool 44 against or with the force of the spring 42.

The spool 44 is provided with a plurality of lands 44a. Reciprocation of the spool 144 causes the lands 44a to stop oil flow between two ports (45a and 45t, 45a and 45r, 45b and 45t, 45b and 45r). A plurality of passages 44b, 44c are defined by the lands 44a. The passages 44b, 44c permits oil flow between two ports (45a and 45t, 45a and 45r, 45b and 45t, 45b and 45r).

When the engine is not running, the hydraulic pump 46 and the OCV 40 are not actuated. Therefore, oil is not supplied to the advanced angle chambers 101 and the retarded angle chambers 102. Oil pressure is not applied on the lock pin 20. When the engine is started, that is, when the engine is being cranked, very little oil pressure is produced. Thus, the lock pin 20 is either engaged with the lock recess 145 or is pressed against the front face of the rear plate 14 by the force of the spring 24.

If the sprocket 11 is rotated by cranking, and if the pin 20 is not already locked, the lock pin 20 is moved along the surface of the rear plate 14 and then is engaged with the lock recess 145. This mechanically couples the sprocket 11, the rotor 12, the rear plate 14 and the camshaft 15. Therefore, when the engine is started, the rotation phase of the camshaft 15 with respect to the sprocket 11 and crankshaft 72 is not varied.

In this embodiment, when the lock pin 20 is engaged with the lock recess 145 in the rear plate 14, the rotation phase of the camshaft 15 is mechanically fixed. This rotation phase is advanced from the most retarded valve timing phase by α degrees. This produces the optimum valve timing for starting the engine, thereby improving the starting performance of the engine.

After the engine is started, if the hydraulic pump 46 produces sufficient oil pressure and the spool 44 is moved leftward (as viewed in FIG. 4), the passage 44b communicates the port 45t with the A port 45a. As a result, oil is supplied to the advanced angle groove 81 by the hydraulic pump 46. The oil is then supplied to the advanced angle chambers 101 via the connection passages 155 in the journal 151, the space 143 and the advanced angle passage 125. This increases the oil pressure in the advanced angle chambers 101.

At the same time, one of the passages 44c communicates the B port 45b with the reservoir port 45r. This causes oil in the retarded angle chambers 102 to be discharged to the oil pan 147 via the retarded angle passage 126 in the rotor 12, the intermediate passages 84 in the rear plate 14, the connection passages 156 in the journal 151, the retarded angle groove 157, the passage 83, the B port 45b, and the reservoir port 45r of the OCV 40. This lowers the oil pressure in the retarded angle chambers 102.

The pressure of oil flowing through the space 143, which is located upstream the advanced angle chambers 101, acts on the second pressure receiving surface 26 via the radial passage 144. The pressure of oil supplied to the advanced angle chambers 101 also acts on the second pressure receiving surface 26 of the lock pin 20 via the connection passage 118. Thus, the pressure acting on the surface 26 is increased by an increase in the amount of oil supplied to the advanced angle chambers 101. When the force of the pressure acting on the second pressure receiving surface 26 is greater than the force of the spring 24, the lock pin 20 is disengaged from the lock recess 145 and is completely accommodated in the bore 117. This allows smooth relative rotation between the rotor 12 and the sprocket 11.

When the pressure in the advanced angle chambers 101 increases and the pressure in the retarded angle chambers 102 lowers, the pressure difference between the chambers 101 and 102 causes the rotor 12 to rotate clockwise as viewed in FIG. 3. This applies a rotating force to the intake camshaft 15 through the rear plate 14, thereby changing the rotation phase of the intake camshaft 15 with respect to the sprocket 11, or the crankshaft 72. That is, the camshaft 15 is rotated to an advanced angle position from the locked position. This rotation of the camshaft 15 advances the times at which the intake valves 77 are opened.

Accordingly, the intake valves 77 are opened when the exhaust valves 78 are opened. This prolongs the valve overlap during which the intake valves 77 and the exhaust valves 78 are opened.

If the OCV 40 moves the spool 44 rightward as viewed in FIG. 4 after the engine is started, the passage 44b communicates the tank port 45t with the B port 45b. In this state, oil is supplied to the retarded angle groove 157 by the pump 45. The oil is then supplied to the retarded angle chambers 102 via the passage 83, the retarded angle groove 157, the connection passages 156, the intermediate passages 84 and the retarded angle passage 126. Thus, the oil pressure in the retarded angle chambers 102 is increased.

At the same time, one of the passages 44c communicates the A port 45a with one of the reservoir port 45r. This causes oil in the advanced angle chambers 101 to be discharged to the oil pan 147 via the advanced angle passage 125 in the rotor 12, the space 143, the connection passages 155 in the journal 151, the advanced angle groove 81, the passage 82, and the A port 45a and the reservoir port 45r of the OCV 40. This lowers the oil pressure in the advanced angle chambers 101.

The pressure of oil supplied to the retarded angle chambers 102 acts on the first pressure receiving surface 25 via the connection passage 119. When the oil pressure is greater than the force of the spring 24, the lock pin 20 is disengaged from the lock recess 145 and is accommodated in the bore 117. This permits smooth relative rotation between the rotor 12 and the sprocket 11.

When the pressure in the retarded angle chambers 102 increases and the pressure in the advanced angle chambers 101 lowers, the pressure difference between the chambers 101 and 102 causes the rotor 12 to rotate counterclockwise as viewed in FIG. 3. This applies a rotating force to the intake camshaft 15 through the rear plate 14, thereby changing the rotation phase of the intake camshaft 15 with respect to the sprocket 11, or the crankshaft 72. That is, the camshaft 15 is rotated to a retarded angle position from the locked position. This rotation of the camshaft 15 retards the times at which the intake valves 77 are opened. Accordingly, valve overlap is decreased or eliminated.

The opening valve timing of the intake valves 77 is thus continuously varied in accordance with the running condition of the engine. Specifically, a target advanced angle is computed based on the running condition of the engine and is compared with the actual advanced angle. The duty ratio transmitted to the actuator 41 of the OCV 40 is varied based on the difference between the target advanced angle and the actual advanced angle. This allows the valve timing to be continuously advanced or retarded. As a result, the times at which the intake valves 77 are opened are continuously varied. The valve overlap is continuously varied, accordingly.

In the mechanism of the prior art, the engine is started with the most retarded valve timing (see FIG. 7). However, according to the present invention, the sprocket 11 is locked with respect to the camshaft 15 at a phase that is advanced by α degrees from the most retarded valve timing when the engine is started. This allows the valve timing to be retarded from the starting phase while the engine is running.

When the engine is stopped, the hydraulic pump 46 stops operating. Oil supply to the engine is stopped, accordingly. The spool 44 in the OCV 40 is moved to the position illustrated in FIG. 4 by the force of the spring 42. In this position, the passage 44b communicates the B port 45b with the tank port 45t. This connects the retarded angle chambers 102 to the oil pan 47. Since the pump 46 is not operating, the oil in the retarded angle chambers 102 is permitted to flow into the oil pan 47. In this position, one of the passages 44c communicates the A port 45a with one of the reservoir ports 45r. This allows the oil in the advance angle chambers 101 to flow into the oil pan 47 via the ports 45a and 45r.

When the oil flows to the oil pan 47, the pressure acting on the first pressure receiving surface 25 and the pressure acting on the second pressure receiving surface 26 are lowered, accordingly. This allows the lock pin 20 to be moved toward the rear plate 14 by the force of the spring 24. When the engine is stopped, the reactive force of the intake valves 77 rotates the camshaft 15, the rear plate 14 and the rotor 12 in the retarded angle direction. In other words, the rotor 12 rotates counterclockwise as viewed in FIG. 3. If this rotation causes the lock recess 145 to face the lock pin 20, the lock pin 20 is engaged with the recess 145. This restricts the relative rotation between the rotor 12 and the sprocket 11. If the recess 145 does not face the lock pin 20, the lock pin 20 remains abutting the front face of the rear plate 14 until the engine is restarted.

As described above, in the variable valve timing mechanism 10, the engine is started with the sprocket 11 locked with respect to the camshaft 15 at a position that is advanced from the most retarded valve timing position by α degrees. Therefore, the engine is started with a valve timing that is advanced from the most retarded angle position. This improves the starting performance of the engine.

The variable valve timing mechanism 10 permits the valve timing to be retarded further than the valve timing at which the engine is started while the engine is running. This permits the utilization of the inertia of the intake air in a high engine speed region, thereby improving the power of the engine. In this embodiment, the most retarded valve timing is different from the valve timing at which the engine is started, that is, the most retarded valve timing is more retarded than the engine starting valve timing. This reduces pumping loss, thereby improving the fuel consumption of the engine.

Further, in above embodiment, oil pressure is constantly applied to the lock pin 20 when the rotor 12 rotates with respect to the sprocket 11, or when the valve timing is being changed. This prevents the lock pin 20 from protruding from the bore 117 when the valve timing is changed. Thus, the lock pin 20 and the rear plate 14 do not abrade each other.

The lock recess 145 according to the above embodiment has an oblong shape that is longer in the radial direction. This prevents the lock recess 145 from being connected to the retarded chambers 102 when the rotor 12 and the rear plate 14 rotate in the retarded angle direction.

When the rotor 12 and the rear plate 14 rotate in the advanced angle direction, the lock recess 145 is communicated with the advanced angle chambers 101. However, the lock recess 145 is already connected to the advanced angle chambers 101 via the space 143 and the radial recess 144. The communication between the recess 145 and the chambers 101 does not disturb the flow of oil.

Although only one embodiment of the present invention has been described, it should be apparent to those skilled in the art that the present invention may be embodied in many other specific forms without departing from the spirit or scope of the invention. Particularly, the invention may be embodied in the following form:

In the illustrated embodiment of the present invention, the bore 117 for accommodating the lock pin 20 is formed in the sprocket 11, and the lock recess 145 with which the lock pin 20 is engaged is formed in the rear plate 14.

However, the lock pin accommodating bore may be provided in the rear plate that rotates integrally with the rotor, and the corresponding lock recess may be formed in the sprocket. This construction also locks the relative rotation of the sprocket with respect to the rotor.

Therefore, the present example and embodiment are to be considered as illustrative and not restrictive and the invention is not to be limited to the details given herein but may modified within the scope and equivalents of the appended claims.

We claim:

1. A method of locking a variable valve timing mechanism for an internal combustion engine, the engine having at least one valve, which is driven by a driven shaft, and a drive shaft, the variable valve timing mechanism serving to vary the timing of the engine valve by varying the rotational phase of the driven shaft with respect to the drive shaft, wherein the variable valve timing mechanism includes a first rotary member for rotating in fixed synchronism with the drive shaft, a second rotary member for rotating in fixed synchronism with the driven shaft, and a hydraulic actuating mechanism for varying the position of the first rotary member with respect to the second rotary member, which changes the phase of the driven shaft with respect to the drive shaft, the hydraulic actuating mechanism including a movable actuator that is movable in two opposite directions between a valve advance limit position, at which the actuator is stopped at a position where the valve timing is advanced to a maximum degree, and a valve retard limit position, at which the actuator is stopped at a position where the valve timing is retarded to a maximum degree, wherein movement of the actuator causes the first rotary member to rotate with respect to the second rotary member thus changing the rotary phase of the drive shaft with respect to the driven shaft;

wherein the method comprises:
locking the first rotary member to the second rotary member with a lock member at a predetermined position for fixing the phase of the driven shaft with respect to the drive shaft when the engine is being cranked, wherein the lock member has a locked position, at which the first rotary member is fixed with respect to the second rotary member and an unlocked position, at which relative movement between the first and second rotary members is permitted, wherein the actuator is spaced from both limit positions when the lock member is locked;
moving the lock member toward its locked position when the engine stops running; and
moving the lock member away from its locked position when the engine has reached a predetermined running condition after being started.

2. A variable valve timing mechanism for an internal combustion engine, the engine having at least one valve, which is driven by a driven shaft, and a drive shaft, the variable valve timing mechanism serving to vary the timing of the engine valve by varying the rotational phase of the driven shaft with respect to the drive shaft, wherein the variable valve timing mechanism includes a first rotary member for rotating in fixed synchronism with the drive shaft, a second rotary member for rotating in fixed synchronism with the driven shaft, and a hydraulic actuating mechanism for varying the position of the first rotary member with respect to the second rotary member, which changes the phase of the driven shaft with respect to the drive shaft, the hydraulic actuating mechanism comprising:

a movable actuator that is movable in two opposite directions between a valve advance limit position, at which the actuator is stopped at a position where the valve timing is advanced to a maximum degree, and a valve retard limit position, at which the actuator is stopped at a position where the valve timing is retarded to a maximum degree, wherein movement of the actuator causes the first rotary member to rotate with respect to the second rotary member thus changing the rotary phase of the drive shaft with respect to the driven shaft;

a first hydraulic chamber located on one side of the actuator;

a second hydraulic chamber located on the opposite side of the actuator;

means for selectively applying hydraulic fluid pressure to the first and second pressure chambers to cause the actuator to move in a selected direction;

a lock member for locking the first rotary member to the second rotary member at a predetermined position for fixing the phase of the driven shaft with respect to the drive shaft, wherein the lock member has a locked position, at which the first rotary member is fixed with respect to the second rotary member and the actuator is fixed with respect to the hydraulic pressure chambers, and an unlocked position, at which the actuator may move with respect to the hydraulic pressure chambers to permit relative movement between the first and second rotary members, wherein the lock member is biased such that the locking member is moved toward its locked position when the engine is not running, and wherein the actuator is spaced from both limit positions when the locking means is locked.

3. The variable valve timing mechanism according to claim 2, wherein the lock member is spring biased toward its locked position and, when the engine reaches a predetermined running condition, is hydraulically biased away from its locked position with a force that is greater than the force of the spring bias, which serves to maintain the lock member in an unlocked position while the engine maintains the predetermined running condition.

4. The variable valve timing mechanism according to claim 2, wherein the lock member engages with a lock recess when it is fully in its locked position such that, if the lock member is not engaged with the lock recess when the engine is in a stopped state, cranking of the engine causes the lock member to align with and to enter the lock recess.

5. A variable valve timing mechanism for an internal combustion engine for varying a timing of a valve actuated by a driven shaft by varying a rotational phase of the driven shaft with respect to a rotational phase of a drive shaft of the engine, the mechanism comprising:

a first rotary member for rotating in synchronism with one of the drive shaft and the driven shaft and having at least one recess therein;

a second rotary member located within the first rotary member for rotating integrally with the other of the driven shaft and the drive shaft, the second rotary member having a vane associated with the recess, the vane being movable between two limit positions within the recess and dividing the recess into first and second pressure chambers;

actuating means for causing relative rotation of the second rotary member with respect to the first rotary member by selectively applying pressures to the first and second pressure chambers to move the vane; and lock means for locking the relative rotation of the second rotary member to the first rotary member such that the vane is kept between the two limit positions when the engine starts with the phase of the second rotary member being fixed with respect to the reference rotational phase and for releasing the lock means after the engine reaches a predetermined running condition.

6. The variable valve timing mechanism according to claim 5, wherein the limit positions of the vane correspond to a most retarded angle position, where the phase of the driven shaft is retarded to the greatest degree with respect to the drive shaft, and a most advanced angle position, where the phase of the driven shaft is most advanced with respect to the drive shaft.

7. The variable valve timing mechanism according to claim 6, wherein the actuating means includes:

a pump for supplying hydraulic fluid to the first and second pressure chambers;

a first passage for connecting the pump to the first pressure chamber;

a second passage for connecting the pump to the second pressure chamber; and a control valve for selectively connecting the pump to the first and second passages.

8. The variable valve timing mechanism according to claim 5, wherein the lock means include:

an engagement recess formed on one of the first rotary member and the second rotary member; and a pin movably supported on the other of the first rotary member and the second rotary member, the pin being selectively engaged and disengaged with the engagement recess according to the movement thereof, wherein the pin engages the engagement recess when the engine is cranked and the pin disengages the engagement recess after the engine reaches the predetermined running condition.

9. A variable valve timing mechanism for an internal combustion engine for varying a timing of a valve actuated by a driven shaft by varying, a rotational phase of the driven shaft with respect to a reference rotation phase of a drive shaft of the engine, the mechanism comprising:

a sprocket for rotating in synchronism with the drive shaft and having a plurality of recesses therein;

a rotor located within the sprocket for rotating integrally with the driven shaft, the rotor having a plurality of vanes associated with the recesses, each vane being movable between two limit positions within each recess and dividing each recess into first and second pressure chambers;

actuating means for making a relative rotation of the rotor to the sprocket by applying pressures to the first and second pressure chambers to move each vane; and lock means for restricting the relative rotation of the rotor to the sprocket such that each vane is kept at position that is between the two limit positions when the engine is cranked such that the phase of the rotor is fixed with respect to the reference rotational phase and for releasing the restriction after the engine reaches a predetermined running condition.

10. The variable valve timing mechanism according to claim 9, wherein the limit positions of the vanes correspond to a most retarded angle position, where the phase of the driven shaft is retarded to the greatest degree with respect to the drive shaft, and a most advanced angle position, where the phase of the driven shaft is most advanced with respect to the drive shaft.

11. The variable valve timing mechanism according to claim 10, wherein the actuating means includes:

a pump for supplying an oil to the first and second pressure chambers;

a first passage for connecting the pump to the first pressure chamber;

a second passage for connecting the pump to the second pressure chamber; and a control valve for selectively connecting the pump to the first and second passages.

12. The variable valve timing mechanism according to claim 11 further comprising a support for rotatably supporting the driven shaft, wherein the first passage includes:

a first introduction passage provided in the support and connected to the control valve;

a phase advancing passage provided in the rotor and communicating to the first pressure chamber; and a first connection passage provided with the driven shaft for connecting the first introduction passage to the phase advancing passage; and wherein the second passage includes:

a second introduction passage provided with the support and connected to the control valve;

a phase retarding passage provided with the rotor and communicating to the second pressure chamber; and a second connection passage provided with the driven shaft for connecting the second introduction passage to the phase retarding passage.

13. The variable valve timing mechanism according to claim 12 further comprising a plate fixed to the driven shaft and the rotor, wherein the lock means includes:

an engagement recess formed on the plate;

a pin supported on the sprocket and being movable in the an axial direction of the sprocket, the pin being selectively engaged and disengaged the engagement recess according to the movement thereof, wherein the pin engages the engagement recess when the engine is cranked, and the pin disengages the engagement recess after the engine starts and reaches the predetermined running condition.

14. The variable valve timing mechanism according to claim 13, wherein the lock means further includes:

urging means for urging the pin toward the engagement recess; and pressure applying means for applying a pressure to the pin to move the pin against the urging force of the urging means.

15. The variable valve timing mechanism according to claim 14, wherein the pin has first and second pressure receiving surfaces, which are axially spaced apart from each other, and wherein the pressure applying means selectively applies pressure to the first and second pressure receiving surfaces.

16. The variable valve timing mechanism according to claim 15, wherein the pressure applying means includes:

a first unlock passage branched from the first passage and connected to the engagement recess for releasing the engagement of the pin and the engagement recess by applying a pressure within the first passage to the second pressure receiving surface of the pin;

a second unlock passage connected to the first pressure chamber for releasing the engagement of the pin and the engagement recess by applying the pressure within the first pressure chamber to the second receiving surface; and a third unlock passage connected to the second chamber for releasing the engagement of the pin and the engagement recess by applying pressure within the second pressure chamber to the first pressure receiving surface.

17. The variable valve timing mechanism according to claim 15, wherein the pin has a large diameter section and a small diameter section, and wherein the first pressure receiving surface is provided between the large diameter section and the small diameter section, and wherein the small diameter section has an end surface that includes the second pressure receiving surface.

18. The variable valve timing mechanism according to claim 17, wherein the sprocket has a hole for accommodating the pin, the hole having a large diameter portion, which extends a greater distance than the large diameter section of the pin, and a small diameter portion, which is shorter than the small diameter section of the pin, whereby a space is formed between the hole and the pin for receiving the hydraulic fluid.

* * * * *

UNITED STATES PATENT AND TRADEMARK OFFICE
CERTIFICATE OF CORRECTION

PATENT NO. : 5,738,056
DATED : April 14, 1998
INVENTOR(S) : Kazuhisa MIKAME, et al.

It is certified that error appears in the above-identified patent and that said Letters Patent is hereby corrected as shown below:

Column 2, line 6, change "93" to --921--.

Column 5, line 24, change "show" to --shown--.

Column 8, line 3, change "permits" to --permit--.

Column 8, line 52, after "upstream" insert --of--.

Column 13, line 44, delete the comma after "varying".

Column 13, line 60, before "position" insert --a--.

Column 14, line 41, delete "an" at beginning of line.

Signed and Sealed this

Tenth Day of November 1998

Attest:

BRUCE LEHMAN

Attesting Officer

Commissioner of Patents and Trademarks